July 15, 1924.
J. C. GRIFFIN ET AL
BUMPER
Filed May 7, 1923
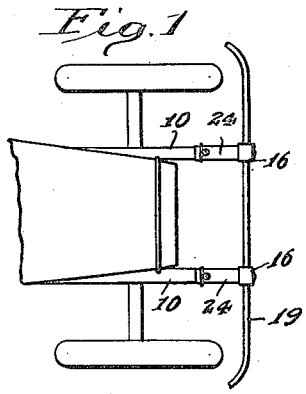
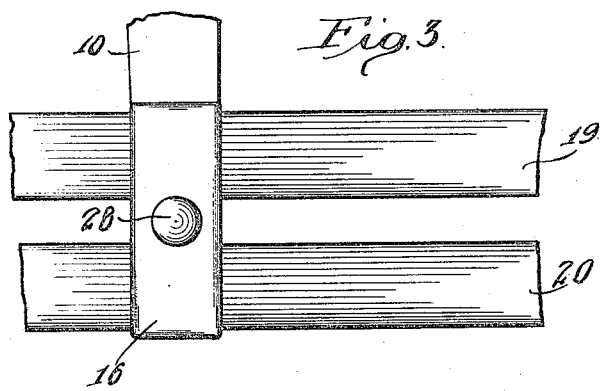
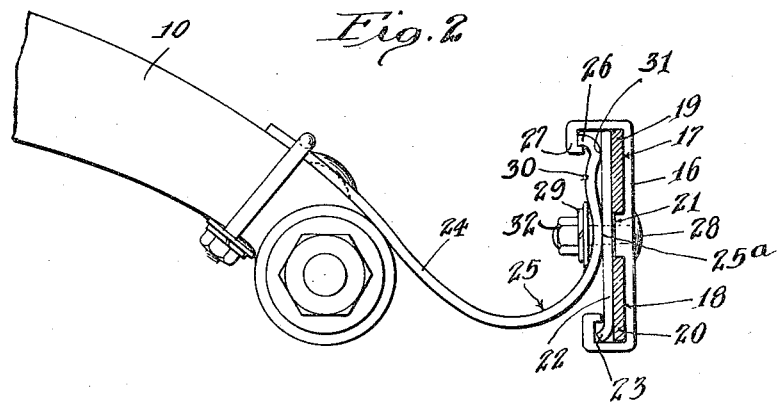
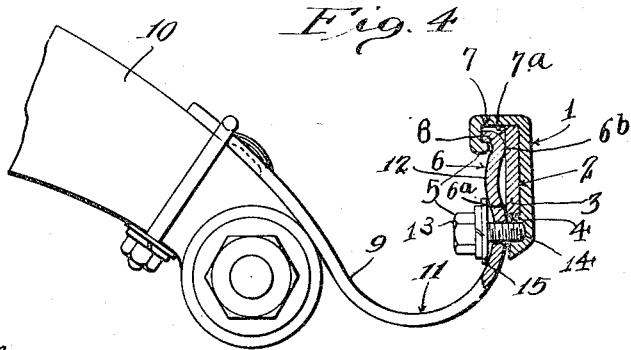
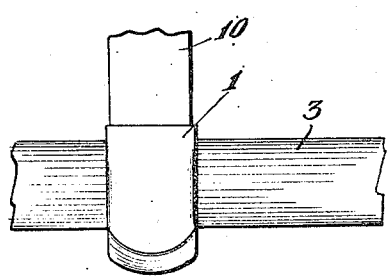
Inventor
Joseph C. Griffin
Walter Jean
By Lyon & Lyon
Attorneys Patented July 15, 1924.

1,501,595

UNITED STATES PATENT OFFICE.

JOSEPH C. GRIFFIN AND WALTER JEAN, OF LOS ANGELES, CALIFORNIA.

BUMPER.

Application filed May 7, 1923. Serial No. 637,137.

*To all whom it may concern:*

Be it known that we, JOSEPH C. GRIFFIN and WALTER JEAN, citizens of the United States, residing at Los Angeles, in the county of Los Angeles and State of California, have invented a new and useful Bumper, of which the following is a specification.

This invention relates to a bumper for automobiles or other vehicles. The general object of the invention is to provide a bumper of simple construction having simple means for attaching it in place, the attaching means operating to secure the bumper to the bumper head and also to secure the bumper head to the supporting bracket. While the improvement is applicable to bumpers of other forms, it is illustrated in the following specification and drawing as applied to a bumper of flat bar type, the improvement enables the bumper to be constructed of a single bar or double bar.

Further objects of the invention will appear hereinafter.

The invention consists in the novel parts and combination of parts to be described hereinafter, all of which contribute to produce an efficient bumper.

A preferred embodiment of the invention is described in the following specification while the broad scope of the invention is pointed out in the appended claims.

In the drawing:

Figure 1 is a plan upon a reduced scale showing the forward end of an automobile to which the invention has been applied.

Fig. 2 is a side elevation of the forward end of the automobile frame and showing the bumper of the double bar type, the bars being shown in cross section.

Fig. 3 is a front elevation of a portion of the bumper shown in Figure 2, but illustrating only one of the bumper heads and showing the bumper bars broken away.

Fig. 4 is a view similar to Figure 2, but illustrating a single bar type of the bumper, parts broken away and sectioned.

Fig. 5 is a view similar to Figure 3, but with the upper portion of the bracket broken away and showing the single bar type of bumper with the bar broken away.

In both types of this bumper, we provide a bumper bar and a head having a transverse slot receiving the bar. This head is provided with a seat adjacent to one edge of the bar at which is secured a clamping part for pressing the bar into the slot. This clamping part has an interlocking connection at the other edge of the bar with the head. The head and bar are both supported on the supporting bracket carried by the vehicle frame. The bracket is formed at the front with a substantially vertical extension, constructed so as to press the bar into the slot at a point near the interlocking connection and near the edge of the bar remote from the interlocking connection. Between the points of pressure, a slight bow is formed to increase the resiliency of the pressure exerted.

As the single type bar is of a simpler construction, we shall describe that form first. This type is illustrated in Figure 4 and embodies a head 1 which may be in the form of a vertically disposed strap having a transverse slot 2 on its rear face. Near the rear face of the bar 3 the head is formed at its lower portion into a seat 4 which is preferably substantially flat. The upper end of the head 1 extends over the upper edge of the bar 3 and has an interlocking connection 5 with the upper end of the vertical extension 6 of a bracket 9. This interlocking connection consists of a socket 7, into which projects the upper end 8 of the extension 6, the socket being closed at the sides by webs 7ª. The forward face of the extension 6 has a cheek 6ª to exert pressure against the rear side of the bar 3 and its upper end is bent to form a nose 6ᵇ to exert pressure on the edge of the bar adjacent the interlocking connection 5. The seat 4 is depressed so as to permit the pressure to be exerted against the face of the bar instead of the seat. Between the nose 6ᵇ and the cheek 6ª, the bracket is formed into a slight bow 12 that gives increased resiliency in the clamping effect.

The bracket 9 is attached in any suitable manner to the forward end of one of the frame bars 10 of the automobile (see Figure 1). This bracket is preferably in the form of a resilient metal strap, the middle portion of which is formed into a large bow 11 that merges into the vertical extension 6. Clamping means such as a clamping bolt 13 is secured to the parts so that it will clamp the end or vertical extension 6 against the bar, and thereby press the same into the slot or socket 2. In this way, the head and bar are both supported and at the same time the supporting bolt clamps the bar between the bracket and the head. In the present instance, this bolt is simply received in a threaded opening 14 formed in the seat 4. In order to give a further resilient effect, we provide resilient means, for example, a spring washer 15 under the head of the bolt and between the bolt and the end of the bow 11.

In the double bar type, we provide a head 16 with an upper transverse slot or socket 17, and a lower transverse slot 18, each slot carrying its corresponding bar 19 and 20, respectively. Between the two bars the head 16 is formed with a boss having a seat 21, and at this seat is received a clamping member 22, the lower end of which has an interlocking connection 23 with the lower end of the head, which extends rearwardly and under the lower edge of the bar (see Figure 2).

In this type we provide a bracket 24, the rear portion of which is constructed like the bracket 9, and it is also provided with a large bow 25; and the forward end of the bracket beyond the bow is formed with an extension having an interlocking connection 26 with the upper end of the head which has a rearward extension and hook 27 to interlock with a hook formed on the upper end of the extension. The forward portion of the bracket is secured to these parts by clamping means such as a through bolt 28, at the face of the clamping member 16 opposite to the seat 21. The point of attachment is located on a cheek 25ᵃ of the bow 25 so as to give resiliency to the connection, but if desired to give increased resiliency, a spring washer 29 may be employed on the bolt.

Between the bolt 28 and the interlocking connection at 26 the extension of the bracket is formed with a slight bow 30 which recedes from the bar 19 and presents its concave face toward the upper bar 19; and above this point the extention is formed into a nose 31 which exerts pressure to clamp the bar 19 in its slot 17. We prefer to extend the clamping member 22 all the way up to the upper end of the head 16 so that the pressure of the nose 31 is exerted upon the face of this clamping member. With this organization of parts, it will be evident that when the nut 32 of bolt 28 is tightened up, resilient pressure will be exerted on the clamping member, the interlocking connection 23 operating as a fulcrum, and the clamping member 22 operating as a lever pressed by the bracket at the seat 21 and near the upper end of the head. The seat 21 is sufficiently depressed with respect to the rear faces of the bars to insure that the clamping effect of the bolt and clamping member is exerted on the bars and not merely on the seat.

It is evident that the invention enables a bumper to be attached to an automobile frame in a very simple manner, and the bumper itself and its attaching parts are of very simple construction.

It is understood that the embodiment of the invention described herein is only one of the many embodiments this invention may take and we do not wish to be limited in the practice of our invention nor in our claims to the particular embodiment set forth.

We claim:

1. In a bumper for vehicles, the combination of a bumper bar, a head having a transverse slot receiving the bar, and having a seat adjacent one edge of the bar, a supporting bracket carried by the vehicle frame with means for clamping the same to the head adjacent the seat, the end of said bracket and said head having an interlocking connection, and said bracket having a nose for exerting pressure to clamp the bar in the slot.

2. In a bumper for vehicles, the combination of a bumper bar, a head having a transverse slot receiving the bar, and having a seat adjacent one edge of the bar, a supporting bracket carried by the vehicle frame with means for clamping the same to the head adjacent the seat, said bracket having an interlocking connection with the head and having a resilient bow with a cheek for clamping the edge of the bar remote from the interlocking connection, said bracket also having a nose for clamping the bar adjacent the interlocking connection.

3. In a bumper for vehicles, the combination of a bumper bar, a head having a transverse slot receiving the bar, a supporting bracket carried by the vehicle frame and consisting of a resilient member with a substantially vertical extension at the front, said extension having an interlocking connection with the head and having a cheek for exerting pressure upon the bar at the edge remote from the interlocking connection, a clamping bolt at said cheek for clamping the head and bar to the bracket, said bracket having a resilient bow between the cheek and interlocking connection with a nose adjacent the interlocking connection for exerting pressure against the bar near its adjacent edge.

4. In a bumper for a vehicle, the combination of a pair of flat bumper bars, a head having a pair of transverse slots, each slot receiving one of said bars, said bracket having a seat between the bars, a clamping member received on the seat and extending across the lower bar, the lower bar of said head and said clamping member having an interlocking connection, a bracket carried by the vehicle seating on the rear side of the clamping member opposite the seat, extending upwardly, and having an interlocking connection with the upper end of said head, and a clamping bolt secured at said seat and operating to clamp the bars to the head and to the bracket.

5. In a bumper for a vehicle, the combination of a pair of flat bumper bars, a head having a pair of transverse slots, each slot receiving one of said bars, said bracket having a seat between the bars, a clamping member received on the seat and extending across the rear sides of the bars, a resilient bracket carried by the vehicle having a cheek seating against the rear side of the clamping member opposite said seat, having a bow thereabove receding from the bars and having a hook at its upper end interlocking with the upper end of the head, said bracket having a nose for engaging the upper end of the clamping member for pressing the same against the upper bar, the lower end of said clamping member pressing the rear side of the lower bar and having an interlocking connection with the lower end of said head, and a clamping bolt attached at the seat securing the bars to the head and to the bracket.

6. In a bumper for vehicles, the combination of a resilient bracket having means for securing it to the car frame, having a bow at its middle portion, with a substantially vertical extension projecting beyond the bow, a bumper bar, a head in the form of a strap extending across the front of the bumper bar, the upper portion of said strap extending across the upper edge of the bar and having a socket near the upper edge of the bar, the upper end of said vertical extension projecting into the socket and making an interlocking connection therewith, and means for clamping the lower portion of the head to the bracket, said bracket operating to clamp the bar to the head.

Signed at Los Angeles, California, this 27th day of April, 1923.

JOSEPH C. GRIFFIN.
WALTER JEAN.